(12) United States Patent
Greulich-Weber

(10) Patent No.: US 11,165,056 B2
(45) Date of Patent: Nov. 2, 2021

(54) METHOD OF PRODUCING AN ELECTRODE MATERIAL FOR A BATTERY ELECTRODE

(71) Applicant: UNIVERSITÄT PADERBORN, Paderborn (DE)

(72) Inventor: Siegmund Greulich-Weber, Bad Lippspringe (DE)

(73) Assignee: UNIVERSITÄT PADERBORN, Paderborn (DE)

(*) Notice: Subject to any disclaimer, the term of this patent is extended or adjusted under 35 U.S.C. 154(b) by 198 days.

(21) Appl. No.: 15/527,463

(22) PCT Filed: Nov. 9, 2015

(86) PCT No.: PCT/EP2015/076088
§ 371 (c)(1),
(2) Date: May 17, 2017

(87) PCT Pub. No.: WO2016/078955
PCT Pub. Date: May 26, 2016

(65) Prior Publication Data
US 2017/0338481 A1 Nov. 23, 2017

(30) Foreign Application Priority Data
Nov. 18, 2014 (DE) .......................... 102014116868.2

(51) Int. Cl.
*H01M 4/38* (2006.01)
*H01M 4/36* (2006.01)
*H01M 4/62* (2006.01)
*H01M 10/052* (2010.01)
*C04B 35/636* (2006.01)
*C04B 35/624* (2006.01)
*C04B 35/622* (2006.01)
*C01B 32/984* (2017.01)
*C04B 35/628* (2006.01)
*H01M 10/0525* (2010.01)

(52) U.S. Cl.
CPC .......... *H01M 4/386* (2013.01); *C01B 32/984* (2017.08); *C04B 35/624* (2013.01); *C04B 35/62281* (2013.01); *C04B 35/62834* (2013.01); *C04B 35/636* (2013.01); *H01M 4/366* (2013.01); *H01M 4/625* (2013.01); *H01M 10/052* (2013.01); *H01M 10/0525* (2013.01); *C04B 2235/3826* (2013.01); *C04B 2235/428* (2013.01); *C04B 2235/5454* (2013.01); *Y02T 10/70* (2013.01)

(58) Field of Classification Search
CPC ...... H01M 4/0471; H01M 4/13; H01M 4/139; H01M 4/386; H01M 4/625
See application file for complete search history.

(56) References Cited

U.S. PATENT DOCUMENTS

| 8,062,556 B2* | 11/2011 | Peres ..................... B82Y 30/00 252/502 |
| 8,734,674 B1* | 5/2014 | Hersam ................. H01M 4/133 252/182.1 |
| 2010/0297502 A1* | 11/2010 | Zhu ........................ H01M 4/62 429/231.8 |
| 2012/0077006 A1 | 3/2012 | Worsley et al. |
| 2013/0280624 A1 | 10/2013 | Lohmann et al. |

FOREIGN PATENT DOCUMENTS

| CN | 102195031 A | * | 9/2011 |
| CN | 102195031 A | | 9/2011 |
| CN | 102195037 A | | 9/2011 |
| CN | 102347475 A | | 2/2012 |
| JP | H0375209 A | | 3/1991 |
| JP | H08259213 A | | 10/1996 |
| JP | 2002056843 A | | 2/2002 |
| JP | 2008066128 A | | 3/2008 |
| JP | 2011076744 A | | 4/2011 |
| JP | 2013171627 A | | 9/2013 |

OTHER PUBLICATIONS

Machine translation of CN 102195031 Zhang et al. retrieved from http://translationportal.epo.org/ on May 2019. (Year: 2011).*
Bettina Friedel et al: "Wide Bandgap Semiconductors—Nanowires of p- and n-type Silicon Carbide", MRS Proceedings, vol. 963, Jan. 1, 2007 (Jan. 1, 2007), XP055241780, D01: 10.1557/PROC-0963-Q15-10 "Abstract"; "Material Synthesis".
B. Friedel et al: "Sol-Gel Silicon Carbide for Photonic Applications", Materials Science Forum, vol. 527-529, Oct. 15, 2006 (Oct. 15, 2006), pp. 759-762, XP055241807, DOI: 10.4028/www.scientific.net/MSF.527-529.759 "Experimental details".
T. Sri Devi Kumari et al: "Nano silic carbide: a new lithium-insertion anode material on the horizon", RSC Advances: An International Journal Further the Chemical Sciences, vol. 3, No. 35, Jun. 25, 2013 (Jun. 2013—p. 15028, XP055241823, GB ISSN: 2046-2069, DOI: 10.1039/c3ra4079 cited in the application "Experimental"; "Conclusions".

(Continued)

*Primary Examiner* — Mayla Gonzalez Ramos
(74) *Attorney, Agent, or Firm* — Davidson, Davidson & Kappel, LLC

(57) ABSTRACT

The present invention relates to a method for producing an electrode material for a battery electrode, in particular for a lithium-ion battery, wherein said electrode material comprises nanostructured silicon carbide, comprising the steps of: a) providing a mixture including a silicon source, a carbon source and a dopant, wherein at least the silicon source and the carbon source are present in common in particles of a solid granulate; b) treating the mixture provided in step a) at a temperature in the range from $\geq 1400°$ C. to $\leq 2000°$ C., in particular in a range from $\geq 1650°$ C. to $\leq 1850°$ C., wherein step b) is carried out in a reactor that has a depositing surface the temperature of which relative to at least one other inner reactor surface is reduced. In summary, a method described above enables to combine a simple and cost-efficient production with a high cycle stability.

5 Claims, No Drawings

(56) References Cited

OTHER PUBLICATIONS

Albert L. Lipson et al: "Enhanced Lithiation of Doped 6H Silicon Carbide (0001) via High Temperature Vacuum Growth of Epitaxial Graphene", Journal of Physical Chemistry C, vol. 116, No. 39, Oct. 4, 2012 (Oct. 4, 2012), pp. 20949-20957, XP055241817, ISSN: 1932-7447, DOI: 10.1021/jp307220y cited in the application "Introduction"; "Experimental section".
International Search Report in Corresponding International Application No. PCT/EP2015/076088, dated Jan. 21, 2016.
Li, Zhimin et al: "Microwave dielectric properties of SiC(B) solid solution powder prepared by sol-gel" Journal of Alloys and Compounds 475 (2009) 506-509; Sep. 10, 2008.
Ying Zheng et al., "Nano-porous Si/C composited for anode material of lithium-ion batteries"; Electrochimica Acta 52; pp. 5863-5867; (2007).
Preliminary Report on Patentability from corresponding International Patent Application No. PCT/EP2015/076088 filed on Nov. 9, 2015.

\* cited by examiner

METHOD OF PRODUCING AN ELECTRODE MATERIAL FOR A BATTERY ELECTRODE

This application is a U.S. national phase application under 35 U.S.C. of § 371 of International Application No. PCT/EP2015/076088, filed Nov. 9, 2015, which claims benefit of German Patent Application No. 10 2014 116 868.2, filed Nov. 18, 2014, the disclosure of which is hereby incorporated by reference herein.

The present invention relates to a method for producing an electrode material for a battery electrode and an electrode for a battery such as in particular an anode for a lithium-ion battery.

Electromobility and the generation of renewable energy often require particularly efficient high-performance energy storage, wherein in particular lithium-ion batteries offer a promising approach because of their relatively high energy density. That is why lithium-ion batteries are frequently used and find application for example in consumer electronics, portable computers as well as in electrically driven vehicles.

From the document "Nano-porous Si/C composites for anode material of lithium-ion batteries", Zheng et. Al. Electrochimica Acta 52 (2007) 5863-5867, for example, it is known to produce electrodes for lithium-ion batteries from composite materials which include elemental silicon and carbon.

Document JP 2008 066128 describes a method for producing an electrode for a lithium-ion battery in which, starting from a polysilane and a carbon source, a composite material is produced which comprises silicon carbide on a carbon material.

Document U.S. Pat. No. 8,734,674 B1 describes a method by which the lithium-ion capacity of silicon carbide is to be improved. To achieve this, this document teaches to carry out a graphitization of doped silicon carbide in an inert atmosphere by means of a defined temperature treatment, wherein further oxide adhering on the surface is to be removed.

The document "Nano silicon carbide: a new lithium-insertion anode material on the horizon", Kumar et al: RCD Adv., 2013, 3, 15028-15034 further describes the use of silicon carbide as a material for anodes for lithium-ion batteries. Here, it is described in detail that 3C silicon is produced by chemical vapor deposition, wherein silicon nanoparticles react with methane to form silicon carbide. However, a doping of the silicon carbide seems to be difficult.

The document "Enhanced Lithiation of Doped 6H Silicon Carbide (0001) via High Temperature Vacuum Growth of Epitaxial Graphene", Lipson et al., J. Phys. Chem. C2012, 116, 20949-20957 further describes an improvement in the electrochemical lithiation capacity of silicon carbide suitable for anodes by surface graphitization by means of a temper process at 1350° C.

However, there is still room for improvements in the production of electrodes, in particular anodes, of batteries such as lithium-ion batteries. In particular, there is further room for improvements in terms of the capacity or energy density and the cycle stability of electrodes or batteries, wherein in particular a cost-efficient solution is of advantage.

It is therefore an object of the present invention to provide a solution by which in a cost-efficient manner a battery can be provided which has a good capacity and/or a good cycle stability.

The object is achieved according to the invention by a method including the features of a method for producing an electrode material for a battery electrode, in particular for a lithium-ion battery, wherein said electrode material includes nanostructured silicon carbide, comprising the steps of: a) providing a mixture including a silicon source, a carbon source and a dopant, wherein at least the silicon source and the carbon source are present in common in particles of a solid granulate; b) treating the mixture provided in step a) at a temperature in the range from ≥1400° C. to ≤2000° C., in particular in a range from ≥1650° C. to ≤1850° C., wherein step b) is carried out in a reactor which comprises a deposition surface, the temperature of which relative to at least one further inner reactor surface is reduced. The object is further achieved by a battery electrode including the features of a battery electrode comprising an electrode material which includes nanostructured silicon carbide and is produced by a process according to the method above. The object is further achieved when the solid granulate provided in step a) is prepared by use of a sol-gel process. The object is additionally achieved when the sol-gel process at least comprises the following steps: c) providing a precursor mixture including a silicon source, a carbon source and optionally a dopant, wherein the precursor mixture is present in a solvent; d) treating the precursor mixture at an elevated temperature while drying the precursor mixture; and e) optionally heating the dried precursor mixture to a temperature in a range of ≥800° C. to ≤1200° C., in particular in a range of ≥900° C. to ≤1100° C. The object is also achieved by the solid granulate provided in step a) carbon present with respect to silicon in an amount greater than an equimolar amount. The object is further achieved when the deposition surface has a temperature that with respect to at least one further inner reactor surface has a temperature which is reduced by an amount in a range of ≥30° C. to ≤200° C., preferably in a range of ≥50° C. to ≤100° C. The object is further achieved by a battery including at least one battery electrode comprising an electrode material which includes nanostructured silicon carbide and is produced by the methods above. The object is further met when the electrode material of the battery electrode above comprises silicon carbide fibers. The object is also met when the electrode material of the battery electrode above includes silicon carbide particles. The object is also met when the silicon carbide comprises a carbon film on its surface. Preferred embodiments of the invention are disclosed in the dependent claims, in the description and in the example, wherein further features described or illustrated in the dependent claims or in the description or in the example individually or in any combination can be a subject of the invention, unless the contrary is not clearly obvious from the context.

A method for producing an electrode material for a battery electrode, in particular, for a lithium-ion battery, is proposed, wherein said electrode material includes nanostructured silicon carbide. The method comprises the steps of:

a) providing a mixture of a silicon source, a carbon source and a dopant, wherein at least the silicon source and the carbon source are provided in common in particles of a solid granulate;

b) treating the mixture provided in step a) at a temperature in the range from ≥1400° C. to ≤2000° C., in particular in a range from ≥1650° C. to ≤1850° C., wherein step b) is carried out in a reactor which comprises a deposition surface the temperature of which is reduced relative to at least one further inner reactor surface.

By means of a method described above an electrode material for a battery, in particular a lithium-ion battery, can be provided, which also in a doped form can be produced in a simple way and which further can enable a high cycle stability.

The method described above thus serves to produce an electrode material for an electrode. Herein, an electrode material means in a conventional manner a material which, alone or optionally together with other materials, can be contacted with a current collector and thus may form an electrode together with the current collector. In particular, by means of the method described above an anode for a lithium-ion battery can be formed.

Here, the following process as a whole or individual ones of the steps a) and/or b) may preferably be carried out under an inert gas, such as in particular argon.

For this purpose, the process comprises initially according to step a) providing a mixture of a silicon source, a carbon source and a dopant, wherein at least the silicon source and the carbon source are present in common in the form of particles of a solid granulate. In particular, it can thus be preferred that each of the particles of the solid granulate comprises a carbon source and a silicon source. The silicon source and the carbon source are used in the further process to enable the production of silicon carbide by a reaction of the carbon source with the silicon source. Therefore, the silicon source and the carbon source should be selected such that they are able to form silicon carbide at the conditions described below, in particular at the following temperatures, for example at normal pressure (1 bar) by means of the method described above.

The selection of the silicon source or the carbon source thus in principle is not limited. Preferred silicon sources may include tetraethylorthosilicate (TEOS), whereas preferred carbon sources may include sugars such as saccharose. For example, a mixture of liquid sugar and tetraethylorthosilicate, dissolved in ethanol, may be provided as a mixture of a carbon source and a silicon source, wherein the invention in an obvious way is not limited to the aforementioned examples.

Regarding the dopant it can be selected based on the desired doping. Herein, the one or more dopants may in principle be added in freely selectable form such as in a manufacturing process of the solid granules as a soluble compound or optionally elementary, for example as a metal. Thus, the dopant may also be part of the solid granulate. Alternatively, it is also conceivable that the doping of the forming silicon carbide, e.g. as forming fibers or 3C silicon carbide nanocrystals, as described in detail below, is implemented during the thermal treatment via the gas phase. As doping materials for an n-type doping preferably phosphorus (P) or nitrogen (N) may be used, which is of great advantage for an electrode, or for a p-doping boron (B) or aluminum (Al) may be used. By means of the doping a sufficient electrical conductivity of the electrode material can be adjusted.

According to step b) the method further comprises treating the mixture provided in step a) at a temperature in the range from ≥1400° C. to ≤2000° C., in particular ≥1600° C., for example in a range from ≥1650° C. to ≤1850° C., in particular in a reactor. In this step it is enabled that silicon carbide is formed from the carbon source or from the silicon source of the solid granulate, respectively.

Herein, depending on the exact temperature selected the specific form of the produced silicon carbide can be controlled. In detail, in setting the temperature in step b) to a range of about ≥1650° C. to about ≤1700° C. at normal pressure (1 bar) in a particularly advantageous manner nanostructured fibers of silicon carbide can be formed. Here, the formation of a temperature gradient can be advantageous such that the material of the solid granulate can pass into the gas phase at a position that has a comparatively higher temperature and silicon carbide fibers can be deposited at the relative lower temperature, such as at a deposition surface.

Thus, in particular for the production of fibrous silicon carbide a deposition surface can be provided which compared to the aforementioned temperature has a reduced temperature. In other words, it may be provided that step b) is carried out in a reactor which comprises a deposition surface the temperature of which is reduced relative to at least one further inner reactor surface. For example, the temperature of the deposition surface may be reduced by a temperature which is in a range of ≥50° C. to ≤100° C. compared to the temperature generally set in the reactor in the aforesaid range of ≥1400° C. to ≤2000° C., in particular ≥1600° C., for example in a range from ≥1650° C. to ≤1850° C. In particular fibrous electrode material has the advantage of a high mechanical flexibility so that during the incorporation or release of lithium species, for example, during a charge or discharge process of a battery, no damage or excessive aging is to be expected. In this way, such electrodes can be operated with a very low degree of aging or a high cycle stability, respectively.

In particular, by means of the embodiment described above comprising the deposition surface in a particular simple way and without requiring a complex equipment it is enabled that silicon carbide is deposited from the gas phase in the desired way in particular in the form of fibers by providing a temperature gradient. By means of the contact with the deposition surface silicon carbide can be deposited directly from the gas phase without the need for further means. For example, the reactor can be implemented as a vessel open to the top such as a cylinder open to the top in which the precursors are heated to the temperature described above. Above the opening open to the top the deposition surface, which may be circular and rotatable, may be directed towards the interior of the vessel such that the gas phase may come into contact with the deposition surface so that the silicon carbide may be deposited here for example in the form of nano-scaled fibers.

If in the reactor a temperature in a range of about >1700° C. to about ≤1850° C. at normal pressure is set, fine nanostructured silicon carbide particles can be formed. In this embodiment a temperature gradient can be waived since the silicon carbide in the form of nanostructured particles is formed directly at the position of the solid granulate or crystallizes there, respectively. An electrode material produced based on this embodiment has likewise a high cycle stability so that such an electrode material, too, can have advantages over the prior art.

For the production of the silicon carbide nanoparticles it may be preferred that the solid granulate has a very fine grain size. In particular, particle sizes in the range of ≤10 μm, for example, in a range of ≥1 μm can be advantageous, wherein the size range can be determined in particular optically, for example by laser diffractometry, and this in principle applies to the corresponding size ranges. Further, the size specifications described above as well as other mentioned size specifications may respectively refer to the D50 values, for example, the D90 values, even if not respectively explicitly indicated. Furthermore, the basic material for the production of nanocrystalline 3C—SiC powder may therefore have approximately the size of the final product since only a volume loss of about 30% occurs.

With respect to fibers, these may be in particular structures in which the ratio of length to diameter is at least greater than or equal to 3:1, whereas opposed to fibers the ratio of length to diameter in particles is less than 3:1. For example, in the present application the ratio of length to diameter of the fibers may in particular be greater than or equal to 10:1, in particular greater than or equal to 100:1, for example greater than or equal to 1000:1.

For example, in the production of silicon carbide particles it is advantageous that the basic material comprises a dense mixture of carbon and silicon, wherein these are not individual silicon and carbon grains but the carbon source and the silicon source are present in each particle. This enables in a particularly advantageous manner that the reaction can take place in a very limited area within the Si—C grain.

With respect to the fiber formation it may be of advantage that due to the intimate mixture of silicon and carbon in the solid granulate under certain circumstances $Si_2C$ and $SiC_2$ may be present already in the gas phase which leads to an easier formation of SiC at a different location in the temperature gradient. Thus, a Si—C gas may be present directly, although other gas components may be present in a way obvious to a person skilled in the art.

Herein, by means of the adjustment of the temperature it may be enabled that the silicon carbide produced is nanocrystalline both in the form of particles as well as in the form of fibers, and in detail a cubic 3C structure of the silicon carbide is achieved. In particular, when the silicon carbide (SiC) is present as a silicon carbide single crystal, preferably as monocrystalline cubic 3C—SiC, the monocrystalline silicon carbide fibers or particles combine a high thermal conductivity, which may be advantageous for the thermal management of the battery, as well as a chemical and thermal stability, which is of advantage for a long-term stability, with the flexibility of the silicon carbide, in particular as fibers, which is of advantage for a high cycle stability. However, within the scope of the present invention also polycrystalline forms of silicon carbide are conceivable.

A further advantage is that silicon carbide as an electrode material can have a high capacity such that an electrode material produced as described above can also provide a good performance of a battery.

Furthermore, inasfar the dopant is not present in the solid granulate comprising the carbon source and the silicon source and the solid granulate according to step a) is transferred to the reactor in which the temperature treatment according to step b) takes place, the dopant may be introduced into the reactor for example as a gas, wherein the mixture according to step a) can be formed directly in the reactor prior to the temperature treatment. This can be particularly advantageous if the dopant can be present as a gas. For example, in this case gaseous nitrogen can serve as a dopant.

Nanostructured silicon carbide nanocrystalline particles and fibers are suitable as anode material for lithium-ion batteries or lithium-ion secondary batteries (LIA) with a great potential for multiple performance enhancement. The materials can directly replace the carbon materials (graphite) currently used as anodes, without the need for significant changes in the corresponding production plants. Thus, conventional production processes can essentially be maintained, which allows a particularly advantageous implementation of the method described above in these existing processes or systems. The usable materials may be optimized for this specific application and production processes can be adapted in an appropriate manner without great effort.

Basically, the above described method offers the advantage that the electrodes, in particular anodes, comprising silicon carbide may have about five to six times higher capacities and may be considerably more cycle resistant or more cycle stable than lithium-ion secondary batteries comprising conventional electrodes.

The particularly high thermal conductivity of silicon carbide may also assist to dissipate the energy losses in the form of heat during charge and discharge processes. Thus, electrodes produced by a method described above further have the advantage of an effective thermal management which may further increase the long-term stability of the electrodes.

An important factor in the method described above is herein the nano scale of the silicon carbide material produced. This can be easily achieved through the use of nanofibers or the use of nano particles or granular silicon carbide, respectively, as described in detail above. Herein, nanostructured silicon carbide in particular means a silicon carbide which in at least one dimension has a maximum spatial dimension in the nanometer range, in particular of less than or equal to 100 nm, wherein the lower limit may be limited by the manufacturing process. In particular, the size of the particles of the solid granulate according to step a) may define the lower limit of the particle size of the silicon carbide, since here usually a size of 70% of the original size or the size of the particles of the solid granulate can be present, wherein the lower limit for fibers may be determined by the temperature at the place of growth, the set temperature gradient and the time of growth of the fibers.

The above described method is also advantageous because the silicon carbide produced immediately after the production is directly suitable for the above described use as an electrode material. Since the silicon carbide can therefore be produced immediately prior to the electrode production and is moreover easily available, a formation of a silicon oxide layer ($SiO_2$) on the surface of the silicon carbide can be prevented. Its selective removal is of importance for the effective operation of lithium-ion secondary batteries according to the prior art which in the prior art is done, for example, by chlorination or use of hydrofluoric acid, followed by carbon deposition. Such an additional step may be waived according to the present invention which can make the process particularly cost-efficient.

In contrast to the electrode material produced according to the invention commercial SiC powder usually has no sufficient purity and is doped only unintentionally. It also often includes a mixture of different SiC polytypes. However, for Li-ion secondary batteries the n-doped pure 3C—SiC being particularly producable by use of the above described method is particularly advantageous.

In summary, the above described method enables to combine a simple and cost-efficient production with a high cycle stability.

In a preferred embodiment of the method described above it may be provided that the solid granulate provided in step a) is produced by use of a sol-gel process. Herein, a sol-gel process means in a known manner a process in which basic materials of the compound to be produced, the so-called precursors, are present in a solvent, wherein this mixture is called sol. In the course of the process a so-called gel is formed by drying or aging, from which by further treatment, in particular heat treatment, a solid can be produced. This solid can thus be defined by the selection of precursors and includes the carbon source and the silicon source for the formation of silicon carbide and may further optionally comprise a dopant for doping of the silicon carbide that can already be added during the preparation of the sol.

The sol-gel process, too, can be carried out completely or at least partially in an inert atmosphere, in particular in an argon atmosphere.

With particular reference to an embodiment of the above described method by use of a sol-gel process it may be provided that the sol-gel process at least comprises the following steps:

c) providing a precursor mixture including a silicon source, a carbon source and optionally a dopant, wherein the precursor mixture is present in a solvent;

d) treating the precursor mixture in particular at a temperature elevated with respect to room temperature (22° C.) while drying the precursor mixture; and e) optionally heating the dried precursor mixture to a temperature in a range of ≥800° C. to ≤1200° C., in particular in a range of ≥900° C. to ≤1100° C.

Thus, according to step c) first the precursors can be provided which are processed into a solid and then can serve as a carbon source or as a silicon source, respectively. Moreover, already in this step a dopant can be added. As a non-limiting example in step c) a mixture of liquid sugar and tetraethylorthosilicate in ethanol can be mixed as a sol.

This according to step d) can be gelatinized or aged under exclusion of air for example in a temperature range near the boiling point of the solvent with the use of ethanol e.g. in a range of 60-70° C., wherein it can further be dried at a temperature above the boiling point. Herein, it may be advantageous if during the drying of the solid particles within a size range of about ≥1 μm to ≤2 μm are formed, wherein, as already indicated above, particles in a size range of ≥1 μm to ≤10 μm for nanocrystalline silicon carbide powder are advantageous, and wherein particles in a size range of >10 μm to ≤2 mm for nanocrystalline silicon carbide fibers are advantageous. Herein, the aforementioned size ranges have in particular process technical advantages, such as preventing the rise of the fine particles during a fiber production. Such a particle size may for example be enabled by a stirring process during the drying process, wherein the particle size may be adjustable, for example, by means of the used stirring device, a rotational speed and the duration or intensity of the stirring process, as is basically known to a person skilled in the art.

According to step e) then optionally a heating of the dried precursor mixture to a temperature in the range of ≥800° C. to ≤1200° C., in particular in a range of ≥900° C. to ≤1100° C., for example at 1000° C., is carried out. By means of this step the solid material produced can be in particular freed of impurities which enables to make the silicon carbide produced particularly pure. This enables a particular high quality of an electrode produced. In addition, in this way a crystallization of the silicon carbide from the gas phase can be improved.

By means of step d) and optionally e) the mixture is provided or completed according to step a).

In summary, in this way in an embodiment a sol-gel process can be used in which the materials to be processed together form a mixture in the form of a gel and are then dried, and in a further step in a carbothermal reduction the crystallization of the silicon carbide, such as the growth of the fibers, takes place. The sol-gel process being known as process per se offers an easily manageable and widely variable possibility for the production of different basic materials for the production of the electrode material according to the invention or of its starting material.

It is of advantage when the doping materials are introduced in the wet chemistry portion of the sol-gel synthesis, whereby the dopants are incorporated into the growing fibers or the particles during the thermal treatment. Herein, the dopants can either be added as a soluble compound or in a metallic form. Alternatively, it is also conceivable that the doping of the forming fibers is made during the thermal treatment via the gas phase. As dopants again preferably phosphorus (P) or nitrogen (N) or boron (B) or aluminum (Al) can be used.

Another possibility of influencing the characteristics of an electrode layer formed in particular of fibers is obtained if the fibers formed are interlinked with each other during a post-treatment in a further sol-gel process. In this way a solid and yet flexible composite of fibers is formed from the individual fibers through interlinking in the area of the contact points of individual or a plurality of fibers, without the need for connecting the fibers with each other by means of textile processing steps.

In a further preferred embodiment of the method it can be provided that in the solid granulate provided in step a) carbon is present with respect to silicon in a greater than an equimolar amount. In other words, the carbon amount can be selected such that in a reaction of all of the silicon into silicon carbide further carbon is still present. For example, carbon can be present with respect to silicon in an amount of ≥1/1 to ≤1.5/1 based on the molar fractions. In particular in this embodiment the process can be carried out in a particularly easy way because by means of the thus implemented modification of the surface of the silicon carbide fibers or the silicon carbide particles by forming a carbon layer or a carbon film on the surface an oxidization of the silicon or a formation of silicon oxide can particularly effective be prevented even when stored in air over a prolonged period. Thus, in particular in this embodiment it can be effectively prevented that additional steps for removing a silicon oxide layer are necessary to enable an effective incorporation of lithium compounds in an operation as an electrode in a lithium-ion battery or a lithium-ion secondary battery. Thus, by means of a comparatively simple and uncomplicated modification of the stoichiometry during the sol-gel process a protective layer having the desired anti-oxidant properties can thus be produced. Here, no additional step is required, which makes the process particularly cost-efficient and time-saving.

Depending on the desired form of the silicon carbide to be produced it can be advantageous that, for example, in a drying process during the gel-sol process, such as by stirring, an appropriate particle size of the solid material is adjusted as described above with respect to step d). For example, it can be preferred, if a particle size in a range of >10 μm to ≤2 mm, such as in a range of ≥25 μm to ≤70 μm, is obtained in order to produce silicon carbide fibers. For the production of silicon carbide particles it may be further of advantage when solid particles in a range of <10 μm, such as ≤5 μm, for example ≥1 μm, are produced.

In a further preferred embodiment of the method it may be provided that the deposition surface has a temperature which is reduced by an amount in the range of ≥30° C. to ≤200° C., preferably in a range of ≥50° C. to ≤100° C., relative to at least one further inner reactor surface. In this embodiment, the deposition in particular of silicon carbide fibers can be carried out particularly effective, wherein such a temperature difference, moreover, is easily adjustable according to process technology.

With regard to further advantages and technical features of the method described above it is hereby explicitly referred to the description of the use, the battery electrode and the battery and to the example, and vice versa.

Subject matter of the present invention is also a use of a method for producing an electrode material for a battery, in particular for a lithium-ion battery, wherein said electrode material includes nanostructured silicon carbide, as the method is described in detail above, for the production of a battery electrode, in particular for producing an anode for a lithium-ion battery.

For this purpose, the electrode material produced or the nanostructured silicon carbide can be combined for example with a polymeric binder and optionally a conductive additive such as graphite, to form a mass, and further be connected to an electrode collector, for example applied thereon. These steps are generally known to those skilled in the art and will not be described here in further detail.

In summary, by use of the above described method for producing an electrode for a battery it is thus enabled to combine a simple and cost-efficient production process with a high cycle stability.

With respect to further advantages and technical features of the use described above it is hereby explicitly referred to the description of the method, the battery electrode, the battery and the example, and vice versa.

Subject matter of the present invention is also a battery electrode comprising an electrode material including nanostructured silicon carbide and produced according to a method as described above in detail.

Such an electrode, in particular an anode of a lithium-ion battery, thus comprises silicon carbide, which is configured or produced as described above. It can be provided that the silicon carbide has a carbon film on its surface. This allows to prevent an oxidation of the material with the formation of silicon dioxide, such that the long-term stability may be enhanced.

Furthermore, the silicon may be doped, wherein the amount of the dopant may be dependent on the desired conductivity of the silicon carbide or the electrode, respectively. Suitable dopants include, for example, nitrogen, phosphorus, boron and aluminum.

For example, the silicon carbide may be nanocrystalline and be configured of nanostructured crystalline fibers or particles or a mixture of fibers and particles. The silicon carbide, for example, may be present in a binder, wherein in the binder further a conductive additive such as graphite may be present.

In summary, by means of the above described battery electrode it is enabled to combine a simple and cost-efficient production with a high cycle stability.

With respect to further advantages and technical features of the above described battery electrode it is hereby explicitly referred to the description of the method, the use, the battery and to the example, and vice versa.

Subject matter of the present invention is moreover a battery, wherein the battery comprises at least one battery electrode as described above in detail.

The above described battery can be a lithium-ion battery. Furthermore, it may be provided that the anode of the battery is configured as described above.

In summary, the above described battery enables to combine a simple and cost-efficient production with a high cycle stability.

With respect to further advantages and technical features of the above described battery it is hereby explicitly referred to the description of the method, the use, the battery electrode and the example, and vice versa.

In the following, the invention will exemplarily be explained with reference to a preferred embodiment, wherein the features described below each individually and in combination may represent an aspect of the invention, and wherein the invention is not limited to the following example.

EXAMPLE

The example described below relates to the production of silicon carbide for anodes for lithium-ion secondary batteries by use of a sol-gel process.

For anodes of lithium-ion secondary batteries 3C—SiC (6H) SiC can be preferably used in two forms, namely as a single crystalline doped SiC nano powder, in particular produced with a surface modification, or as single crystalline doped SiC nanofibers, also in particular produced with a surface modification as described below.

Hereinafter, at first the production process for nanocrystalline SiC powder and for nanocrystalline SiC fibers by use of a sol-gel process is described.

Preparation of the sol-gel Si—C precursor: In the following the chemical composition, the sol-gel processing with different drying steps at 70° C. to 200° C. and the final obtaining of the Si—C solid granulate at 1000° C. is described.

Liquid sugar, tetraethylorthosilicate and ethanol are mixed as a sol and gelatinized at 60-70° C. under exclusion of air. The composition for a formulation was (a) a colloidal suspension of 135 g of tetraethylorthosilicate (TEOS) dissolved in 168.7 g ethanol as a silicon source and (b) a solution of 68 g of saccharose as a carbon source, in 75 g of distilled water, to which 37,15 g hydrochloric acid (HCl) is added as a catalyst for forming invert sugar. Subsequently, solution (a) and the liquid sugar (b) were mixed together under stirring. Alternatively, instead of the solution (b) liquid sugar (invert sugar, 122 g 70%) may be used directly. Then no water and only a very small amount of hydrochloric acid (5.2 g) are added, since this is only required for initiating the gelling process. This sol is aged at 50° C. and then dried at 150-200° C.

For the production of SiC fibers preferably coarser granulate is required (some 10 μm) so that temporary stirring is carried out during the aging and/or drying process. For nanocrystalline SiC powder permanent stirring takes place at 200° C. Thereby the precursor granulate is decomposed into a very fine powder, which is preferred for the production of nanocrystalline SiC powder. This granulate or powder is freed of remaining unwanted reaction products at 1000° C. in a nitrogen or argon gas stream and finally ground, if necessary.

Now, a modification of the SiC precursor for the purpose of doping of SiC nanofibers and SiC nanopowders can take place. An n-type doping may be done, for example, with nitrogen (exemplary additives: nitric acid, ammonium chloride, potassium nitrate or melamine), or with phosphorus (exemplary additives: potassium dihydrogen phosphate or disodium hydrogen phosphate). A p-type doping can take place, for example, with boron (exemplary additives: Disodium tetraborate) or with aluminum (additive: aluminum powder). The dopants are added to the sol, wherein the amounts are dependent on the specific additive and the desired doping concentration.

With regard to the silicon carbide fiber production, the resulting solid material is heated in a high temperature reactor, wherein the granulate from 1400° C., in particular from 1600° C., passes into the gas phase and monocrystalline silicon carbide fibers are deposited on a rotating substrate under a temperature gradient. In particular nanocrystalline fibers for Li-ion secondary batteries applications grow from 1650° C. to 1700° C. in the gas phase or on a deposition surface which is about 50-100° C. cooler.

Regarding the SiC nano powder production it is also operated within a high temperature reactor, but without temperature gradient, wherein the precursor powder crystallizes to single crystal 3C—SiC.

Regarding a surface modification preferably the following two conditions should be met in order to allow an effective diffusion of lithium-ions into 3C—SiC: High bulk doping and surface conductivity. The bulk doping is carried out as described above during the SiC production. The production of highly pure nanoparticles (crystals and fibers) can be carried out in an inert atmosphere. All subsequent production steps such as coating of the current conductors, e.g. metal foils, for lithium-ion secondary batteries can then take place within a few hours or completely under exclusion of oxygen in order to prevent an oxidation of the surface. More practical and electrically more meaningful is the production of the SiC nanoparticles by use of a surface modification directly with an electrically conductive protective layer, in particular a carbon-containing protective layer. This is achieved here by a change in the ratio of carbon and silicon in the precursor granulate by a few percent for the advantage of carbon. This simplifies the production process substantially.

The invention claimed is:

1. A method for producing a battery electrode using an electrode material for a battery electrode, in particular for a lithium-ion battery, wherein said electrode material includes fibrous nanostructured silicon carbide, having a carbon-containing protective layer formed on the silicon carbide, comprising the steps of:
   a) providing a mixture including a silicon source, a carbon source and a dopant, wherein at least the silicon source and the carbon source are present in common in particles of a solid granulate;
   b) treating the mixture provided in step a) at a temperature in the range >1650° C. to ≤1700° C., wherein step b) is carried out in a reactor which comprises a deposition surface the temperature of which relative to at least one further inner reactor surface is reduced by an amount in a range of ≥50° C. to ≤100° C. compared to the temperature generally set in the reactor in the aforesaid range of >1650° C. to ≤1700° C.: wherein in the solid granulate provided in step a) carbon is present with respect to silicon in an amount greater than an equimolar amount such that a carbon-containing protective layer is formed on the silicon carbide.

2. The method according to claim 1, characterized in that the solid granulate provided in step a) is prepared by use of a sol-gel process.

3. The method according to claim 2, characterized in that the sol-gel process at least comprises the following steps:
   c) providing a precursor mixture including a silicon source, a carbon source and optionally a dopant, wherein the precursor mixture is present in a solvent; and
   d) treating the precursor mixture at an elevated temperature while drying the precursor mixture.

4. The method according to claim 3, characterized in that the sol-gel process comprises the following further step:
   e) heating the dried precursor mixture to a temperature in a range of ≥800° C. to ≤1200° C.

5. The method of claim 3, characterized in that the sol-gel process comprises the following further step:
   e) heating the dried precursor mixture to a temperature in a range of ≥900° C. to ≤1100° C.

* * * * *